UNITED STATES PATENT OFFICE.

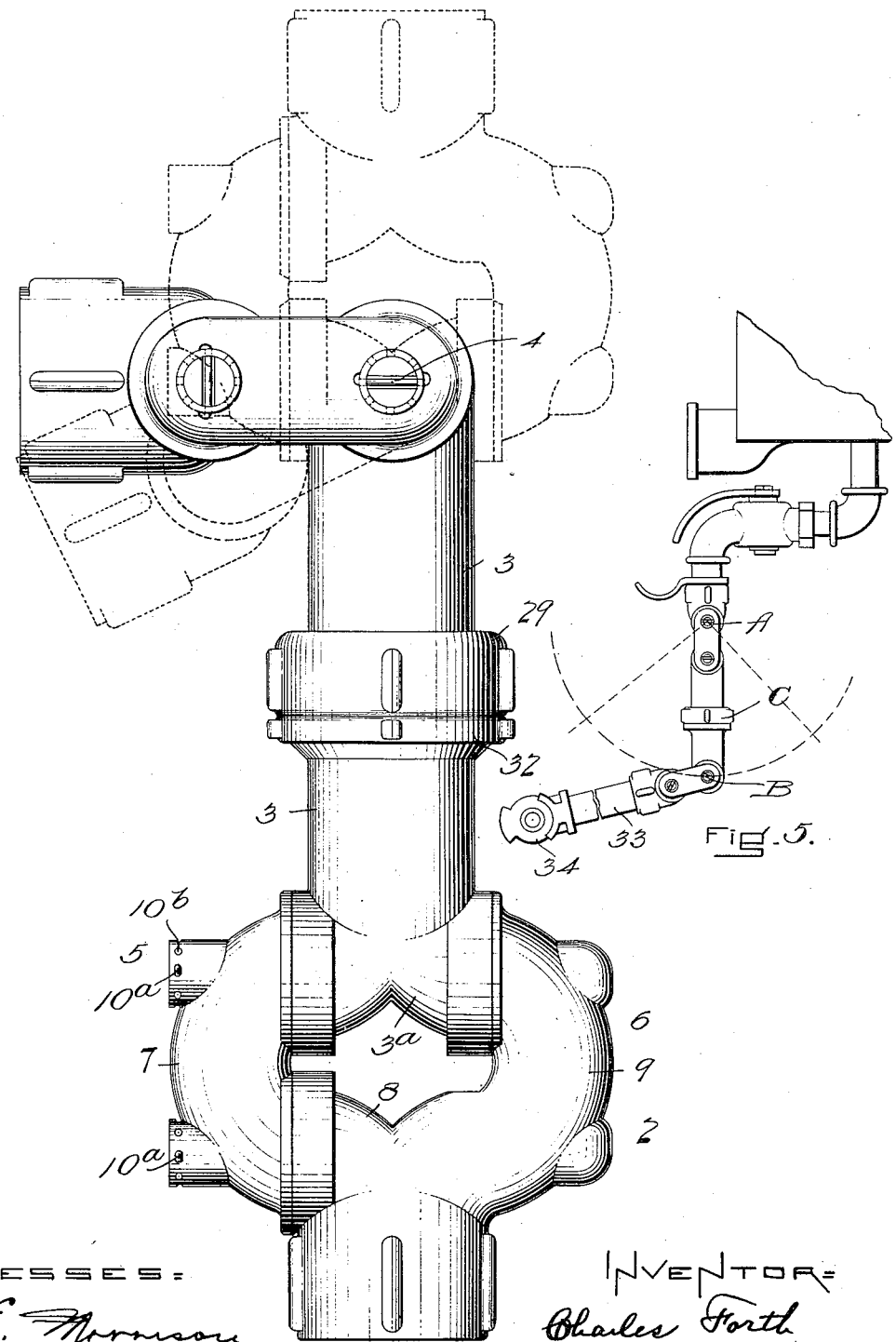

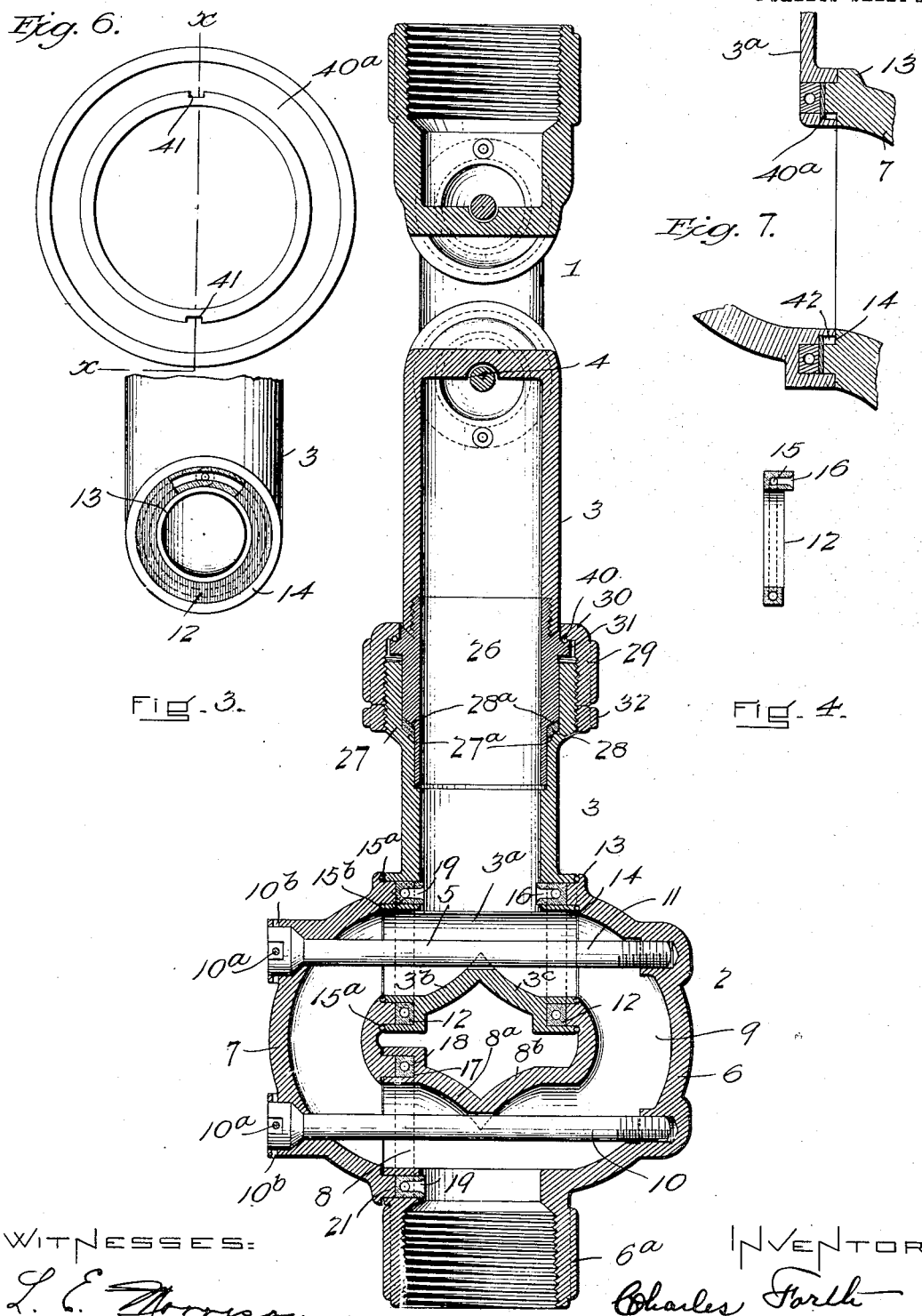

CHARLES FORTH, OF BOSTON, MASSACHUSETTS.

PIPE-JOINT.

1,007,655. Specification of Letters Patent. Patented Oct. 31, 1911.

Application filed August 10, 1908. Serial No. 447,859.

*To all whom it may concern:*

Be it known that I, CHARLES FORTH, a citizen of the United States, residing at Boston, in the county of Suffolk and State of Massachusetts, have invented certain new and useful Improvements in Pipe-Joints, of which the following is a specification, reference being had therein to the accompanying drawings.

This invention relates to pipe couplings or joints designed to admit of flexure of the connecting parts in all directions or universally, the object of the invention being to produce a coupling of this character, suitable for pipe installation generally for use in connection with steam, air, oil, or other fluids.

The invention is designed more particularly for service on railway trains, where the conditions demand a joint which will possess the greatest freedom of movement in all directions, and at the same time be fluid tight and free from leaks.

The invention consists of a coupling embodying, as its main features, two hollow end-members of improved form adapted to be connected with the pipe terminals in the system, and an intermediate hollow connecting member jointed to the end-members in such manner that the parts may pivot on two axes disposed at right angles to the longitudinal axis of the connecting member.

The invention consists also in providing the intermediate connecting member with a swiveling joint, permitting of a free turning of one of the end-members relative to the other around the longitudinal axis of the connecting member; whereby the two axes on which the end-sections pivot, may be caused to occupy different positions relative to each other in every point in the circumference of the circle, thereby permitting of a flexure of the joint universally in every direction.

The invention consists also in various features of novelty, directed more particularly to the specific form of the end-members or sections; the manner of jointing the connecting member thereto; the specific form of the swiveling joint in the connecting member; the form of the packing between the end-members and the connecting member; and various other details and improvements designed to render the joint as a whole extremely flexible, free in movement and fluid tight.

In the accompanying drawings: Figure 1 is a side elevation of my improved coupling; Fig. 2 is a longitudinal section through the same; Fig. 3 is a plan view of one end of the intermediate connecting member, showing the groove therein for the reception of the packing ring; Fig. 4 is a sectional view of the packing ring removed; Fig. 5 is the elevation showing my improved coupling applied to a railway car. Figs. 6 and 7 are enlarged details of a pipe joint constructed in accordance with the invention.

My improved coupling comprises hollow end-sections or members 1 and 2, and an intermediate hollow connecting member 3, jointed to the end sections on axes 4 and 5, disposed preferably at right angles to each other, to permit the parts to pivot in two directions. The end sections are each in the form of two parts, a main body portion 6, and a cap 7, between which parts of the two end sections, the ends of the connecting member are seated and have a pivotal bearing. The main body portion 6 is formed with a threaded neck $6^a$ for attachment to the pipe terminal, from which extends a short hollow arm 8, and in the opposite direction, a long hollow arm 9, the latter being curved upwardly at its end and extending parallel with the short arm, and terminating some distance below the level of the latter. The cap 7 is in the form of a hollow elbow, one end of which is seated on and forms a continuation of the free end of the hollow arm 8, while the other end terminates in axial alinement with the free end of the long arm 9, and some distance from it, between which parts is mounted a hollow head $3^a$ extending at right angles from the end of the connecting member 3, one end of said head being seated against the free end of the cap elbow, while the opposite end of the head is seated against the free end of the long hollow arm 9, the parts assembled in this manner thus forming a tubular continuous passage through the end sections and intermediate connecting member.

The parts are held together by two bolts 10 and 11, the former passing through the cap at one side and threaded at its end in the interior of the body portion 9, and the other bolt 11 passing through the cap at the opposite side and centrally through the head 3ª, with its end threaded in the body portion at that side, the bolt 11 thus extending coincidently with the axis on which the parts pivot. From this construction it will be seen that the cap may be removed bodily and endwise from the body portion by unscrewing the fastening bolts, which will in turn release the intermediate connecting member and permit the parts to be readily separated, and also facilitate their quick assemblage.

In order that a tight joint may be formed between the relatively movable parts of the coupling, I propose to form grooves in the ends of the head 3ª to receive a suitable packing in the form of rings 12, and to form on the end of section 7, and the end of the long hollow arm 9, ribs to enter the grooves and confine the packing rings, the latter being of a thickness somewhat less than the depth of the grooves, so that the ribs will project therein, the grooves thus constituting in effect journal bearings, and the ribs constituting journals mounted in the bearings and forming the pivotal connection between the end members and the intermediate section. Adjoining the ribs the parts are formed with annular shoulders 13 and 14, which bear against the ends of the head 3ª along the sides of the grooves therein; whereby undue pressure against the faces of the packing rings is prevented, and binding of the parts avoided. Friction balls 15ª and 15ᵇ to constitute ball bearings may be interposed between the shoulders and ends of the head 3ª to cause the parts to turn with ease and freedom.

I prefer to form the packing rings of flexible or elastic material such as rubber, and hollow, as shown in Fig. 4, with a contour in cross-section corresponding to that of the grooves, and I propose to form an opening 15 in one wall of the rings in communication with the fluid passing through the coupling, so that this fluid by entering the opening and filling the packing ring, will exert its expansive force and press the four sides of the ring outward in close contact with the four inclosing surfaces, and thus effectually seal the joint against leakage. The opening in the ring extends through a nipple 16, projecting from the side of the ring, which nipple extends in turn through an opening formed in the base of the grooves and projects into the passage through the coupling, this construction retaining the rings effectually in place and preventing their displacement.

The construction of the joint between the outer end of the cap and the free end of the short hollow arm 8 is similar to that just described, the end of the short arm being formed with a circular groove 17 to receive a hollow packing ring 18, provided with a hollow nipple 19 extending through an opening in the base of the groove to permit the pressure to enter the packing ring, the ring being confined as before by a circular rib 21 on the outer end of the elbow section 7.

The bolts 10 and 11, before alluded to, have their heads seated in sockets formed in bosses on the exterior of the cap section, and are prevented from turning and unscrewing by means of locking pins 10ª extending through grooves in the heads, and adapted to enter any pair of a series of alining holes 10ᵇ formed in the bosses, the ends of the pins being bent upwardly after being passed through the holes, in order to prevent their escapement.

The intermediate connecting member 3 may be formed in one rigid piece throughout and with the hollow heads 3ª on its ends disposed either at right angles to each other, which would allow for the pivotal action of the coupling, or two axes at right angles only, or these heads may be disposed in the same plane parallel with each other, which would allow for the pivotal action of the coupling, on two parallel axes, but I prefer to form the said intermediate member in two sections so jointed together that one may be turned around relatively to the other on the longitudinal axis of the member, the result being that by this turning movement, the two axes on which the ends pivot in the end members, may be caused to assume all intermediate positions relatively to each other around a circle described from a center coincident with the longitudinal axis of the connecting member.

Any suitable form of joint in the intermediate connecting member may be provided which will permit the parts to swivel, as described, and at the same time prevent the leakage of the fluid passing through the coupling, but I prefer to adopt the construction shown more particularly in Fig. 2, where it will be seen that one of the sections of the intermediate connecting member 3 has screwed into it, a steel sleeve 26 projecting therefrom and entering loosely the enlarged end 27 of the other adjoining section, a packing 28 being interposed between parallel shoulders 27ª and 28ª on the sleeve and enlarged end respectively. The outer side of the enlarged end 27 is threaded and receives an interiorly threaded collar 29, formed with an inturned flange 30 engaging behind an annular shoulder 31 on the sleeve, a jam nut 32 being screwed up against the end of the collar to lock same. By this construction it will be seen that the parts are held endwise together, and the packing compressed between the shoulders, thereby preventing the escape of the fluid and at the same time permitting of a free swiveling movement of the sections of the connecting member.

In Fig. 5 I have shown my improved coupling applied to a train-pipe system. Here it will be seen that the intermediate connecting member stands in a vertical position, with the upper end member connected with the terminal of the pipe on the car. The other end section extends horizontally, and is connected with a short pipe section 33, which in turn is connected with the usual coupling 34. The adjoining car is equipped in like manner, and in operation, as the cars approach and recede from each other, the coupling joints on the horizontal axes A B, assuming the angular positions represented by the dotted lines. In turning curves, the two sections of the intermediate connecting member swivel relatively to each other on the swiveling connection C. It is seen, therefore, that the coupling is well adapted for use in train pipe connections, and avoids the use of rubber, or other flexible connections universally employed in such locations. The coupling provides for the movements of the cars to and from each other, and their angular relations to each other in "rounding" curves.

In order to cause the two sections of the connecting member to swivel with the least friction, antifriction balls 40 are interposed between the inturned flange 30 on the threaded collar 29, and the annular shoulder 31 on the sleeve 26.

It will be observed that the internal surface of the end members formed conjointly by the long hollow arm 9 and the cap section is curved, so as to offer a minimum amount of friction to the flow of the fluid, the stream entering the coupling through the coupling neck 6ª, being divided by oppositely inclined inwardly curved surfaces 8ª and 8ᵇ, formed on the interior of the hollow arm 8, and constituting an abutment, causing the stream to flow in opposite directions through the cap section and the long hollow arm, while the flow of the fluid in the opposite direction is divided by similarly formed inclined inwardly curved surfaces 3ᵇ and 3ᶜ, formed on the interior of the hollow head 3ª of the connecting member, and constituting an abutment facing in the opposite direction, the provision of these abutments and curved surfaces obviating all abrupt surfaces which would act to retard the flow of the fluid.

In order that the inner face of the circular ribs may be prevented from coming in direct contact with the faces of the packing rings, and thereby causing their displacement, I apply between the packing ring and rib a thin metallic circular washer 40ª, which, as shown in Figs. 6 and 7, is provided with inwardly extending lips 41, extending in open slots 42 in the inner wall of the groove, whereby it is held in place and prevented from shifting around, while at the same time being capable of moving outward in the groove under the expansion of the packing ring. As a result of this construction the faces of the ribs move against a metallic surface, there being no relative movement between the metal and the rubber packing ring.

Having thus described my invention, what I claim and desire to secure by Letters Patent of the United States is:

1. In a pipe joint, an end member comprising a main portion having branch passages therethrough, and a hollow separable cap section having a passage through it communicating with one of the branch passages in the main portion, in combination with a hollow member jointed between the other branch passage of the main portion and the passage through the cap section, a fastening bolt connected with the cap section at one end and with the main portion of the joint and extending through the jointed hollow member, and a second bolt connected with the opposite end of the cap section and with the main portion.

2. In a pipe joint, the combination of two hollow members, one provided with a circular groove having an annular bearing surface adjoining the same, and the other provided with a circular rib to enter the groove and an annular shoulder bearing directly against the bearing surface, and a hollow packing ring seated in the groove between the base of the same and face of the rib, said packing ring having continuous side walls formed with an opening communicating with the interior of the joint; whereby the fluid passing through the joint will enter the packing ring and expand the same.

3. In a pipe joint, an end member comprising a long hollow arm and a short hollow arm, the said short arm being provided with a circular groove, a separable cap section provided at one end with a circular rib seated in the groove in the short arm, a packing ring in said groove between the face of the rib and base of the groove, in combination with a hollow connecting member having in its ends circular grooves, packing rings seated respectively in said grooves, a circular rib on the other end of the cap section extending in one of the grooves in the connecting member and a circular rib on the end of the long arm extending in the other groove in the connecting member.

4. In a pipe joint, an end member comprising a hollow body portion and a hollow separable cap section, in combination with a connecting member mounted at its ends between the body and cap and forming a continuation of the passages therein, the said connecting member being provided with circular grooves and annular bearing surfaces at the sides of the same, packing rings in said grooves hollow in cross section and formed with an opening communicating with the passage through the joint, ribs on the body portion and cap entering said grooves, and shoulders adjoining said ribs and bearing on the said annular bearing surfaces.

5. In a pipe joint, the combination of two hollow members, one provided with a circular rib, and the other with a circular groove to receive the rib, the wall of said groove being formed with an opening communicating with the interior of the joint, a hollow packing ring with walls continuous in cross-section and seated in the groove between the base of the same and face of the rib, and a hollow nipple on the packing ring extending in the opening in the wall of the groove; whereby fluid passing through the joint may enter the hollow packing ring and expand the same.

6. In a pipe coupling the combination with two relatively movable members, one provided with a circular groove and the other with a circular rib to enter the groove, an expansible packing ring seated in the groove, and a circular washer interposed between the packing ring and face of the rib, said washer being movable outward under the expansion of the ring, and means for holding the washer against rotative movement.

In testimony whereof, I have affixed my signature in presence of two witnesses.

CHARLES FORTH.

Witnesses:
 PHILIP LUFT,
 ERNEST D. CONDIT.